United States Patent

[11] 3,625,469

[72] Inventors Haruo Nitta;
Naotoshi Sagawa, both of Yokkaichi-shi, Mie, Japan
[21] Appl. No. 851,914
[22] Filed Aug. 21, 1969
[45] Patented Dec. 7, 1971
[73] Assignee Mitsubishi Petrochemical Co., Ltd.
Chiyoda-ku, Tokyo, Japan
[32] Priority Aug. 21, 1968
[33] Japan
[31] 43/59395

[54] APPARATUS FOR MOLDING SYNTHETIC RESINS
3 Claims, 1 Drawing Fig.
[52] U.S. Cl. .................................................. 249/115,
18/47 C
[51] Int. Cl. ..................................................... B29c 1/04

[50] Field of Search ........................................ 249/114, 115; 25/122

[56] References Cited
UNITED STATES PATENTS

| | | | |
|---|---|---|---|
| 1,600,514 | 9/1926 | Seailles et al. ............... | 25/122 UX |
| 1,789,197 | 1/1931 | Seailles et al. ............... | 25/122 UX |
| 3,213,491 | 10/1969 | Craig ............................ | 249/114 X |
| 3,391,726 | 7/1968 | Edstrom ...................... | 249/114 X |

Primary Examiner—J. Howard Flint, Jr.
Attorney—Sughrue, Rothwell, Mion, Zinn & Macpeak ABSTRACT: Molding a synthetic resin in a metallic mold provided with glassy layer, such as a porcelain enamel layer, on its molding surface. The molded article is excellent in gloss and easily removed from the mold. The glassy layer is heat resistant and durable in adherence to the mold.

PATENTED DEC 7 1971
3,625,469
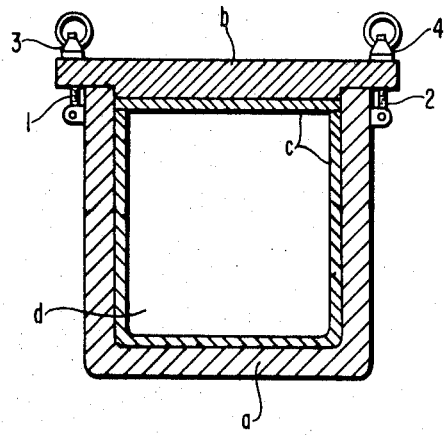
INVENTORS
HARUO NITTA
NAOTOSHI SAGAWA
BY Sughrue, Rothwell, Mion,
Zinn & Macpeak
ATTORNEYS

APPARATUS FOR MOLDING SYNTHETIC RESINS

BACKGROUND OF THE INVENTION

1. Field of the Invention

The present invention relates to a mold for molding synthetic resins, which provides improved removability of the molded article, and to a method for molding a resin by using a said mold.

2. Description of the Prior Art

A molding method for synthetic resins, which comprises filling up or charging a desired amount of granular or powdery synthetic resin material in a metallic mold, heating, cooling the metallic mold after the resins have become molten, and removing the solidified molded article therefrom, has hitherto been practiced.

However, removing of the molded article from such metallic molds has proven difficult. To solve this defect, it has been suggested to coat the mold with a removal agent, such as a silicone grease or to line it with silicone resin, fluorine resin, or the like. However, such methods have failed to produce satisfactory results.

As a mold is subjected repeatedly to high temperatures and rapid cooling in such molding methods, the lack of heat resistance of the removal agent itself and the lack of durability in close adherence of covering agents with the metallic mold have proven to present problems.

SUMMARY OF THE INVENTION

Applicants have discovered that, when a glassy material, such as porcelain enamel, is coated on the forming surface of a metallic mold and the molding process is carried out in such a mold, not only is the ease of removal of the article obtained excellent, but also the molded article has very excellent gloss. Moreover, a glassy material has excellent heat resistance and durability of adherence to the mold. In the present specification, the terms "glassy layer" or "glassy material" represent a solid layer or material of noncrystalline structure formed by the melting and subsequent cooling of an inorganic material.

The object of the present invention is therefore the provision of a mold for molding a synthetic resin which is treated with a glassy material on its molding surfaces.

As the above-described glassy materials may be mentioned combinations of quartzite, feldspar, borax, soda lime, fluorite, sodium nitrate or cobalt oxide blended in the proper ratio with nickel oxide, manganese dioxide, calcium carbonate, magnesium carbonate, ammonium carbonate, sodium nitrite or the like, and employed as an underglaze for improving close adherence with a metallic mold, and combinations of quartzite, feldspar, fluorite, soda lime, chile saltpeter, cryolite, antimony oxide or metallic antimony, blended in the proper ratio with tin oxide, clay, Epsom salts, barium chloride, or the like, to be used as an overglaze.

Of course, the glassy materials used in the present invention are not limited only to the above combinations, but may be varied or modified in a manner well known to those skilled in the art.

BRIEF DESCRIPTION OF THE DRAWING

The FIGURE is a longitudinal section showing an embodiment of a glazed metallic mold used in the method for molding synthetic resin according to the present invention.

DETAILED DESCRIPTION OF THE PREFERRED EMBODIMENT

The present invention will be illustrated with the following example in combination with the drawing.

EXAMPLE

The interior surfaces of a cylindrical metallic mold member $a$, of 200 mm. in diameter and 300 mm. in length, having a bottom made of well polished mild steel plate of 2.3 mm. in thickness, and another metallic mold member $b$ facing metallic mold member $a$, are pretreated with a cleaner to remove deposited oils and fats and, thereafter, are coated by spraying with a precompounded porcelain enamel-forming material, drying at about 150° C. for 15 minutes and subsequently baking at 800° C. for 3 minutes, to obtain a dense porcelain enamel layer (glassy material layer) $c$. After a granular or powdery synthetic resin is charged, filling the space $d$, the metallic mold members $a$ and $b$, having the porcelain enamel layers on their molding surfaces, are combined and fixed by means of a pair of locking bolts 1 and 2, and locking nuts 3 and 4 to define the desired cylindrical molding space $d$. Molding then proceeds by heating the mold by hot air produced by flame, heated steam, electricity or the like, meanwhile maintaining mold either in a quiet state or under rotation in the direction of either one or two axes. After cooling, the molded article can be removed from the mold and possesses a beautiful glossy surface. No sticking to the mold members $a$ and $b$ is obtained. It has been found that the removability of the article from the metallic mold members $a$ and $b$ and the durability of the close adherence of the enamel layer $c$ to the surfaces of metallic mold members $a$ and $b$ are scarcely changed, even by repeated use.

Experimental results with the metallic molds of the present invention in comparison with a metallic mold coated with a silicon resin are as follows.

Silicone resin was sprayed onto metallic mold members of the same material and the same shape as the above metallic mold members $a$ and $b$ after previously well cleaning the interior surface of the metallic mold with alcohol, followed by baking at 220° C. for about 2 hours to form a silicone resin layer adhered to the mold.

1 kg. of powdery polyethylene having a melt index of 10 g./10 min. and a density of 0.918 was charged to the metallic mold having the porcelain enamel layer $c$ and the metallic mold having the silicone layer, respectively, and each metallic mold was heated at a mold temperature of about 330° C. for 8 minutes while rotating the metallic mold in two-axes directions. Thereafter, the molds were immersed in water to be cooled and the solidified molded article removed. This operation was repeated. The molded article produced from the silicone-coated mold was lowered in ease of removal after about 100 operations and the silicone resin coating layer peeled from the metallic mold. On the other hand, ease of removal of the molded article was not lowered after 300 repeated operations with the metallic mold coated with the enamel layer, and the enamel layer did not peel from the metallic surface of the mold.

Thus, a metallic mold coated with a porcelain enamel layer on their interior surface have been found to be remarkably more excellent, both in molding ability and in close adherence of the coating to the mold surface in comparison with the metallic mold having a silicone resin layer.

The glassy material comprising porcelain enamel layer $c$, of the present invention, preferably comprises an underglaze which is a combination of quartzite, feldspar, borax, soda lime, fluorite, sodium nitrate or cobalt oxide with nickel oxide, manganese dioxide, calcium carbonate, magnesium carbonate, ammonium carbonate, sodium nitrite or the like, and an overglaze which is a combination of quartzite, feldspar, fluorite, soda lime, chile saltpeter, cryolite, borax, antimony oxide or metallic antimony with tin oxide, clay, Epsom salt, barium chloride, or the like.

More particularly, the porcelain enamel layer comprises two layers. The first, underglaze layer is one having essentially the same rate of expansion as the metal mold and comprises the following ingredients, which are coated on the metal surface of the mold and baked:

| INGREDIENT | AMOUNT (% by weight) |
| --- | --- |
| Quartizite | 12–24 |
| Feldspar | 8–36 |

| Ingredient | Amount |
|---|---|
| Borax | 21-29 |
| Soda Lime | 14-15 |
| Fluorite | 3-9 |
| Sodium Nitrate | 2-5 |
| Cobalt (II) Oxide | 0.3-0.6 |
| Manganese (IV) Oxide | 0-1 |
| Nickel Oxide | 0-0.4 |
| Molybdenum Oxide | 1-2 |

The cobalt, manganese, nickel and molybdenum oxides are incorporated into the underglaze in order to improve the adherence of said underglaze to the metal.

Following the baking of the underglaze, the underglazed surface is then coated with an overglaze having a lower melting point than that of the underglaze and having the following composition:

| INGREDIENT | AMOUNT (% by weight) |
|---|---|
| Quartitize | 10-40 |
| Feldspar | 15-40 |
| Borax | 15-20 |
| Soda Lime | 4-15 |
| Fluorite | 2-5 |
| ANtimony (as the oxide) | 4-7 |

If desired, coloring materials, such as metal oxides or sulfides and the like may be incorporated into the above overglaze.

In the present invention, as described above, a dense glassy material layer is formed on the interior surface of a metallic mold and thereby the removability, from that surface, of molded resin is improved. This ease of removal is not degraded, even by repeated continuous molding operations, and, therefore, not only can the efficiency of operation be elevated, but further, the surface of the molded articles obtained are beautifully finished and the durability of the metallic mold itself is improved as a result of the close adherence of the glassy material layer to the metallic mold surface not being deteriorated by repeated use. The present invention is characterized by being widely utilizable, not only in various molding methods using powdery or granular synthetic resin, but also in other synthetic resin molding methods.

What is claimed is:

1. In a metallic mold adapted for molding a synthetic resin, the improvement comprising the interior surface of the metal constituting said mold having a glassy coating layer consisting essentially of an underglaze layer and an overglaze layer, said underglaze layer consisting essentially of from about 12 to about 42 weight percent quartzite, from about 8 to about 36 weight percent feldspar, from about 21 to about 29 weight percent borax, from about 14 to about 15 weight percent soda lime, from about 3 to about 8 weight percent fluorite and from about 2 to about 5 weight percent sodium nitrate, and wherein said overglaze layer consists essentially of from about 10 to about 40 weight percent quartzite, from about 15 to about 40 weight percent feldspar, from about 15 to about 20 weight percent borax, from about 4 to about 15 weight percent soda lime, from about 2 to about 5 weight percent fluorite and from about 4 to about 7 weight percent antimony calculated as oxide.

2. The metallic mold of claim 1 wherein said underglaze layer further contains at least one adhesion promoter selected from the group consisting of cobalt oxide, manganese oxide, nickel oxide and molybdenum oxide.

3. The metallic mold of claim 2 wherein said cobalt oxide is present in an amount of from about 0.3 to about 0.6 weight percent, wherein said manganese oxide is present in an amount of up to about 1 weight percent, wherein said nickel oxide is present in an amount of up to about 0.4 weight percent and wherein said molybdenum oxide is present in an amount of from about 1 to about 2 weight percent.

* * * * *